Feb. 14, 1967 F. PAULIK ETAL 3,303,689

SAMPLE HOLDERS FOR THERMOANALYTIC EXAMINATION

Filed March 26, 1964 4 Sheets-Sheet 1

INVENTORS
FERENC PAULIK
JENŐ PAULIK
LÁSZLÓ ERDEY
BY Young & Thompson
ATTYS.

INVENTORS
FERENC PAULIK
JENŐ PAULIK
LÁSZLÓ ERDEY
BY Young & Thompson
ATTYS.

SAMPLE HOLDERS FOR THERMOANALYTIC EXAMINATION

Filed March 26, 1964 4 Sheets-Sheet 3

INVENTORS
FERENC PAULIK
JENŐ PAULIK
LÁSZLÓ ERDEY
BY Young & Thompson
ATTYS.

SAMPLE HOLDERS FOR THERMOANALYTIC EXAMINATION

Filed March 26, 1964 4 Sheets-Sheet 4

INVENTORS
FERENC PAULIK
JENŐ PAULIK
LÁSZLÓ ERDEY
BY Young & Thompson
ATTYS.

3,303,689
SAMPLE HOLDERS FOR THERMOANALYTIC EXAMINATION

Ferenc Paulik, Jenö Paulik, and László Erdey, Budapest, Hungary, assignors to Magyar Optikai Müvek, Budapest, Hungary, a firm Filed Mar. 26, 1964, Ser. No. 354,854
Claims priority, application Hungary, Apr. 6, 1963, PA–765
3 Claims. (Cl. 73—15)

Most compounds undergo various chemical and physical alterations under the effect of heat. These alterations involve in all cases changes in the heat content, i.e. heat is released or absorbed, and in many cases the weight of the test piece or sample is also changed, with simultaneous gas liberation. Differential thermoanalysis (DTA) is based on continuous determination of the changes in heat content of the test piece as a function of the temperature, thermogravimetry is based on measuring the changes of weight, and thermoanalysis of gases comprises recording the process of gas evolution. Complex thermoanalytic methods represent various combinations of the above described simple thermoanalytic methods.

Figure 1A:
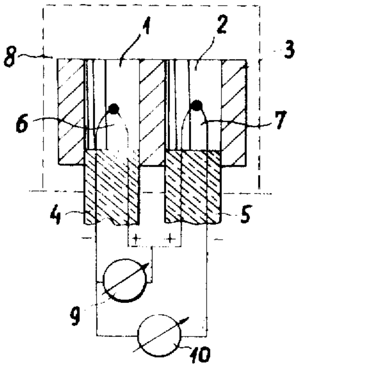
FIG. 1a (PRIOR ART)

In differential thermoanalysis (DTA), see FIG. 1*a*, the test piece 1 and a control test piece 2 of inert material are placed each in a bore of a steel block 3. The welding points of two thermocouples 6 and 7 inserted each in double bores of heat-insulating porcelain rods 4 and 5 are embedded in the test piece and in the control test piece, respectively. The temperature of the system is raised by means of an electric oven 8 at a uniform rate, while the temperature of the test piece is measured with the aid of a galvanometer 9 connected in the circuit of the thermocouples 6, 7 in opposition. A second galvanometer 10 is used for measuring the temperature difference between the test piece and the control test piece of inert material.

Figure 1B:
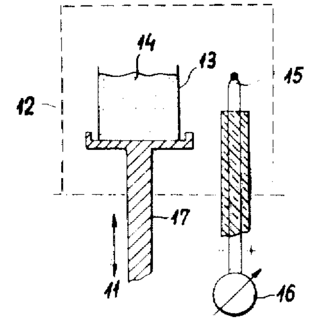
FIG. 1b (PRIOR ART)

The thermogravimetric method (TG) (FIG. 1*b*) is based on continuous measurement by a balance 11 of the change in weight of the test piece 14 which is placed in a crucible 13 and heated by oven 12. The temperature of the oven is simultaneously measured by thermocouple 15 and galvanometer 16. The crucible 13 for the test piece weighs on the balance 11 through the agency of a porcelain rod 17.

Figure 1C:
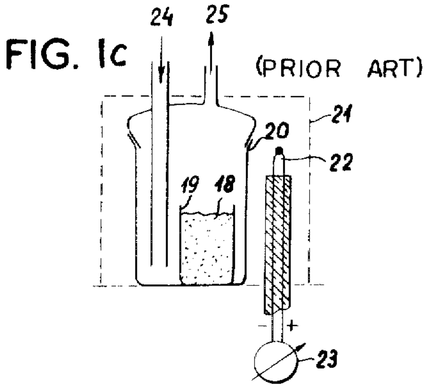
FIG. 1c (PRIOR ART)

The principle of thermoanalysis of gases (GE), (FIG. 1*c*) is as follows: The crucible 19 containing the test piece 18 is placed in a closed vessel 20 which is heated by the oven 21. Temperature is measured by thermocouple 22 and galvanometer 23. Several methods are known to determine the gases evolved. According to one of these methods an inert gas 24 is introduced into the closed vessel 20, and the heat conductivity of the liberated gases 25 is measured; the heat conductivity changes when the decomposition under heat of the test piece commences and the liberated gaseous decomposition product is mixed with the inert gas.

Figure 1D:
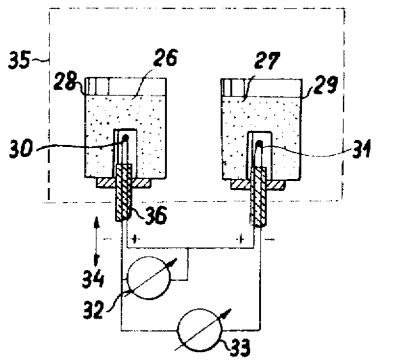
FIG. 1d (PRIOR ART)

Various complex thermoanalytical methods have been elaborated by combining these methods of examination. One of these complex methods is the derivatography (FIG. 1*d*). Here, the temperature of the test piece 26 or the difference between the temperature of the test piece and the inert material 27 is measured with the aid of thermocouples 30, 31 and galvanometers 32, 33 indirectly through the wall of the inwardly bent part of each crucible. The test piece 26 heated by electric oven 35 weighs on balance 34 through the porcelain rod 36. In this manner not only the change in the heat content of the test piece is determined (FIG. 2*a*, graph DTA) but also the change in weight (FIG. 2*c*, graph TG), or even the rate of change in weight (FIG. 2*b*, graph DTG) by means of a derivation apparatus coupled to the balance.

In the case of the above described simple or complex thermoanalytical methods the examinations have hitherto been performed with relatively large amounts of substances such as 1 to 5 grams of powdered substance, in order to determine the changes in temperature, weight, and—for example—thermal conductivity of gaseous decomposition products with sufficient accuracy. It has been found, however, that the use of large amounts of material, i.e. of thick layers is detrimental, since the gaseous decomposition products which have been liberated in the course of the thermal decomposition of the test piece can diffuse only with difficulty through the thick layer of the compound to be tested. The gaseous decomposition products expel part of the air from the space between the particles of the test piece, accumulate, and shift the balance of the reversible thermal decomposition reactions in the direction of higher temperatures. Under these conditions the thermal decomposition reactions proceed but slowly, within a wide temperature range. Hence, the reactions closely following one another often overlap and amalgamate to such an extent that they can no longer be clearly distinguished with the aid of the shape of thermoanalytic heat decomposition graphs.

It is the object of the present invention to ensure, with simultaneous elimination of the above-mentioned drawbacks, that the alterations to be examined take place within relatively narrow temperature ranges, with sharp distinction between the successive alterations. With a view to these objects, a relatively small amount of the sample, say 0.1 to 2 g., is spread out in a thin layer over a large surface, the thermocouple being in heat-exchange relationship with the appropriately shaped sample holder either directly, or indirectly through the air enclosed by the walls of the sample holder and with the sample indirectly through the sample holder. The arrangement according to the invention for holding the sample consists advantageously of a number of trays arranged one above the other with clearances and having flanged rims.

The invention will be more particularly described with reference to the attached drawings, which illustrate the basic idea of the invention and its effect produced on the diagrams plotted, as well as two embodiments, by way of example, of the arrangement according to the invention.

Figure 1E:
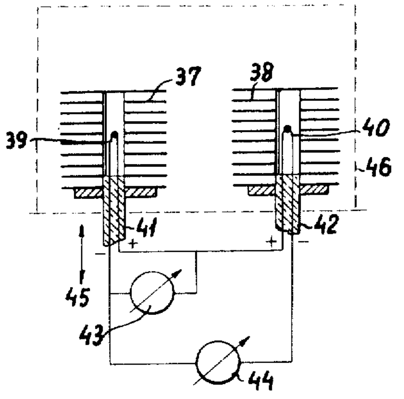
Figure 1F:
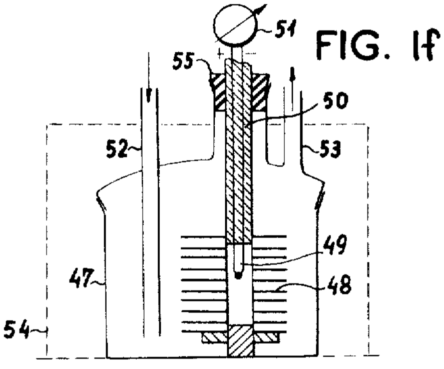

FIGS. 1*a* to 1*d* show some known methods of arranging the samples, whereas FIGS. 1*e* and 1*f* represent the arrangement according to the invention.

Figure 2:
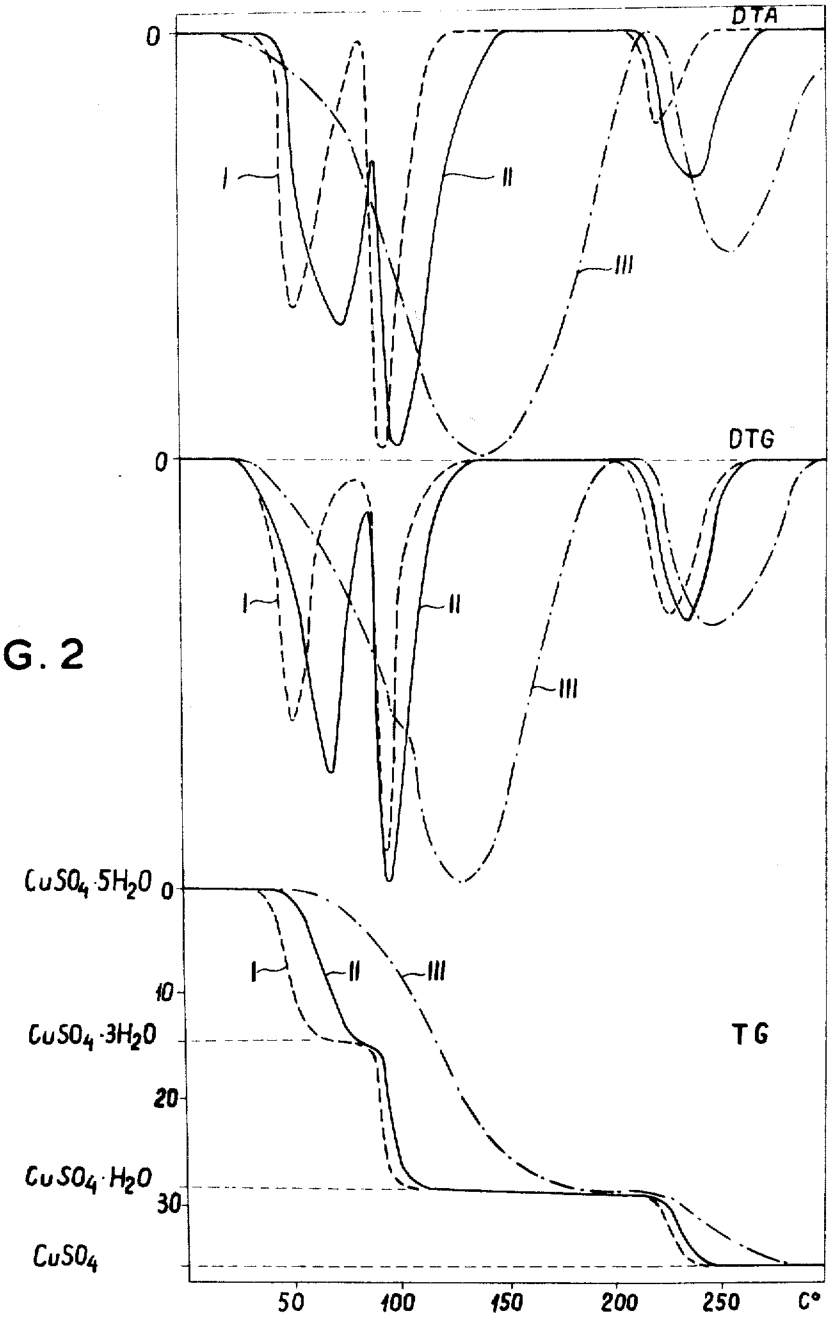

In FIG. 2, DTA, DTG, and TG diagrams are depicted.

Figure 3A:
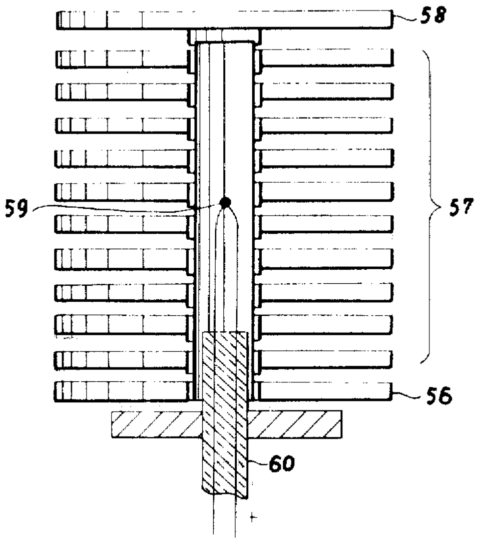
Figure 3B:
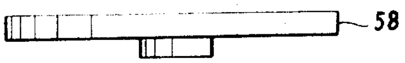
Figure 3C:
Figure 3D:
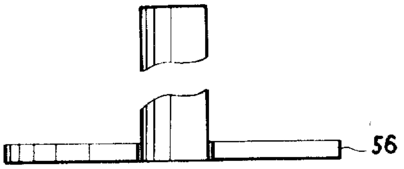
Figure 3E:
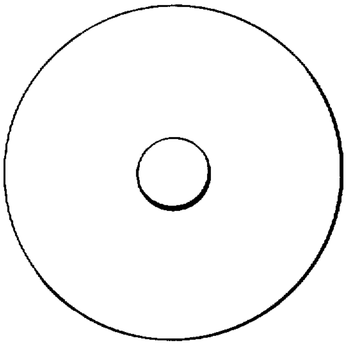
Figure 4A:
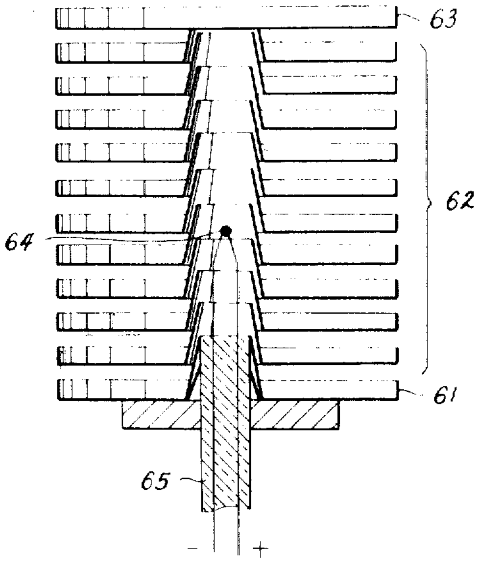
Figure 4B:
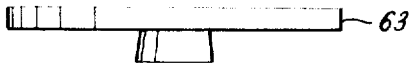
Figure 4C:
Figure 4D:
Figure 4E:
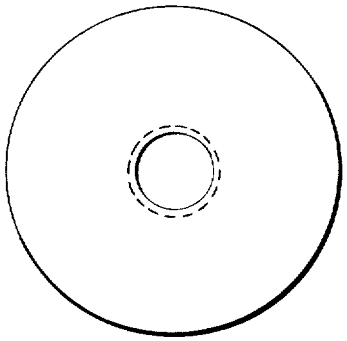

FIG. 3*a* is a vertical section through one arrangement according to the invention, FIGS. 3*b* to 3*d* show vertical sections through three different forms of tray. FIG. 3*e* is a bottom view of the trays.

FIGS. 4*a* to 4*e* are views similar to those of FIG 3, illustrating another form of sample holder.

FIG. 3 illustrates a sample holder arrangement according to the invention which may be composed of three different parts. One is a tube made of a precious metal and closed at one end, with a flanged tray 56 welded on its open end. The second part comprises a number of flanged trays 57, each having a spacer flange to be fitted on the tubular portion of said tube. The third part is a tray 58 closing the stack. The compound to be tested is proportionally distributed and spread out in thin layers on the several trays, all made of a precious metal. Thereafter the arrangement can be assembled and fitted on the porcelain rod 60 supporting the thermocouple 59.

In another possible embodiment of the arrangement the first tray is welded to the thermocouple and serves only to support the other trays, and cannot be removed.

FIG. 4 shows a further embodiment of the trays in which the spacer flanges provided in the center of the different fitted parts 61, 62, 63 are conically shaped, so that they form, after having been assembled, a tube closed at one end. The thermocouple 64 placed in the porcelain rod pipe 65 serves also in this embodiment to determine the temperature of the air enclosed in said tube, since, according to experience, the enclosed air assumes the temperature of the trays which in turn assume the temperature of the sample lying on them over a large area.

The arrangement according to the invention can be used to great advantage in connection with simple thermogravimetric measurements (TG), with differential thermoanalysis (DTA) as well as with thermic gas development measures (GE), and with the various complex thermoanalytic methods, replacing the conventional steel blocks or crucibles.

FIG. 1*e* shows a schematic diagram of the derivatograph, similarly to FIG. 1*d*, when using the sample holder according to the invention. 37 and 38 designate the trays for holding the sample and the inert substance, respectively, 39 and 40 the thermocouples, 41 and 42 the double-bored porcelain rods fitted to the base of the oven 46 and engaging the balance 45.

It follows from this figure that the arrangement according to the invention may be used for simple differential thermoanalysis as well as for thermogravimetric examinations.

FIG. 1*f* represents an example for increasing the selectivity of thermoanalysis of gases (GE) by the use of the arrangement according to the invention. The individual parts of the measuring arrangement shown in the figure are as follows: closed vessel 47, gas inlet pipe 52, gas outlet pipe 53, trays 48 for the sample, double-bored porcelain rod 50 with a fitting plug 55, a thermocouple 49 in the double bore, and galvanometer 51 for measuring the temperature.

The examination of chemical and physical conversions taking place between solid and gaseous compounds also fall within the scope of thermoanalysis. These phenomena are usually examined by thermoanalytic methods, either based on the principle of dynamical measurement, increasing the temperature at a uniform rate, or with the statical method, in which the system is kept at room temperature or at a higher constant temperature. In this manner the adsorption of gases on various adsorbents may be followed with the aid of the thermobalance. Reactions taking place in the gaseous or vapor phase, and the efficiency of catalyses may be examined by differential thermoanalytic methods, since the temperature of the catalyst changes under the effect of the gas reactions which take place on its surface. The arrangement according to the invention can be advantageously used in such examinations, too.

Since the sample of the compound to be tested engages the trays over a large surface, the latter closely follow the temperature of the sample which renders possible accurate determination of the change in temperature of the sample.

On the diagrams shown in FIG. 2 the results of DTA, DTG and TG examinations have been plotted, showing the dehydration of copper sulphate pentahydrate. The temperatures have been plotted against the abscissa, while the ordinates show the deflection of the galvanometer in the DTA and DTG tests, and the changes in weight in percentage in the TG test. The graphs I and II have been plotted for samples of 100 mg. and 1000 mg., respectively, spread out on the trays in the arrangement according to the invention illustrated in FIG. 1*e*, and represent the dehydration as a three-step procedure. In contradistinction, the graphs III plotted for a 1000 mg. sample placed in a conventional crucible of the derivatograph (FIG. 1*d*) are blurred so that the first two dehydration steps entirely coalesce. Experience has shown that the dehydration of copper sulphate is erroneously shown as a two-step procedure also by other simple thermoanalytic apparatus. Hence, the use of the sample holder arrangement according to the invention is adapted to substantially increase selectivity of the thermoanalytic method, i.e. the accuracy of quantitative and qualitative determination.

What we claim is:

1. A sample holder for use in a thermal testing apparatus to increase the selectivity of thermonalytic examinations, comprising a plurality of horizontally disposed trays of a material of high thermal conductivity, each adapted to hold a thin layer of sample to be tested; each of said trays having a central opening; said central opening of each of said trays being surrounded by a spacing flange; said trays being separably stacked coaxially one above the other, in such a manner that each tray is vertically spaced from the next adjacent tray by one of their spacing flanges so as to provide a central space defined by the openings in said trays and by said spacing flanges; and a thermocouple disposed in said central space to monitor the temperature thereof, said temperature being representative of the temperature of said thin layers of sample.

2. A sample holder as claimed in claim 1, said spacing flanges contacting adjacent said trays to space the trays apart.

3. A sample holder as claimed in claim 1, said flanges being located at the radially innermost portions of said trays.

References Cited by the Examiner

Boersma, S. L. "A Theory of DTA and New Methods of Measurement and Interpretation." In Journal of the American Ceramic Society. 38(8): 281–284. August 1955. TP 785 A62.

Garn, P. D., et al. "Free Diffusion Sample Holder." In Analytical Chemistry. 32(13): p. 1900–1901. December 1960. QD 71 A42.

Garn, P. D. "Thermal Analysis—A Critique." In Analytical Chemistry. 33(9): p. 1247–1251. August 1961. QD 71 A42.

RICHARD C. QUEISSER, *Primary Examiner.*

J. C. GOLDSTEIN, *Assistant Examiner.*